Oct. 10, 1961      E. J. McGRATH      3,003,661
ARTICLE HANDLING MACHINE
Filed April 25, 1957      4 Sheets-Sheet 3
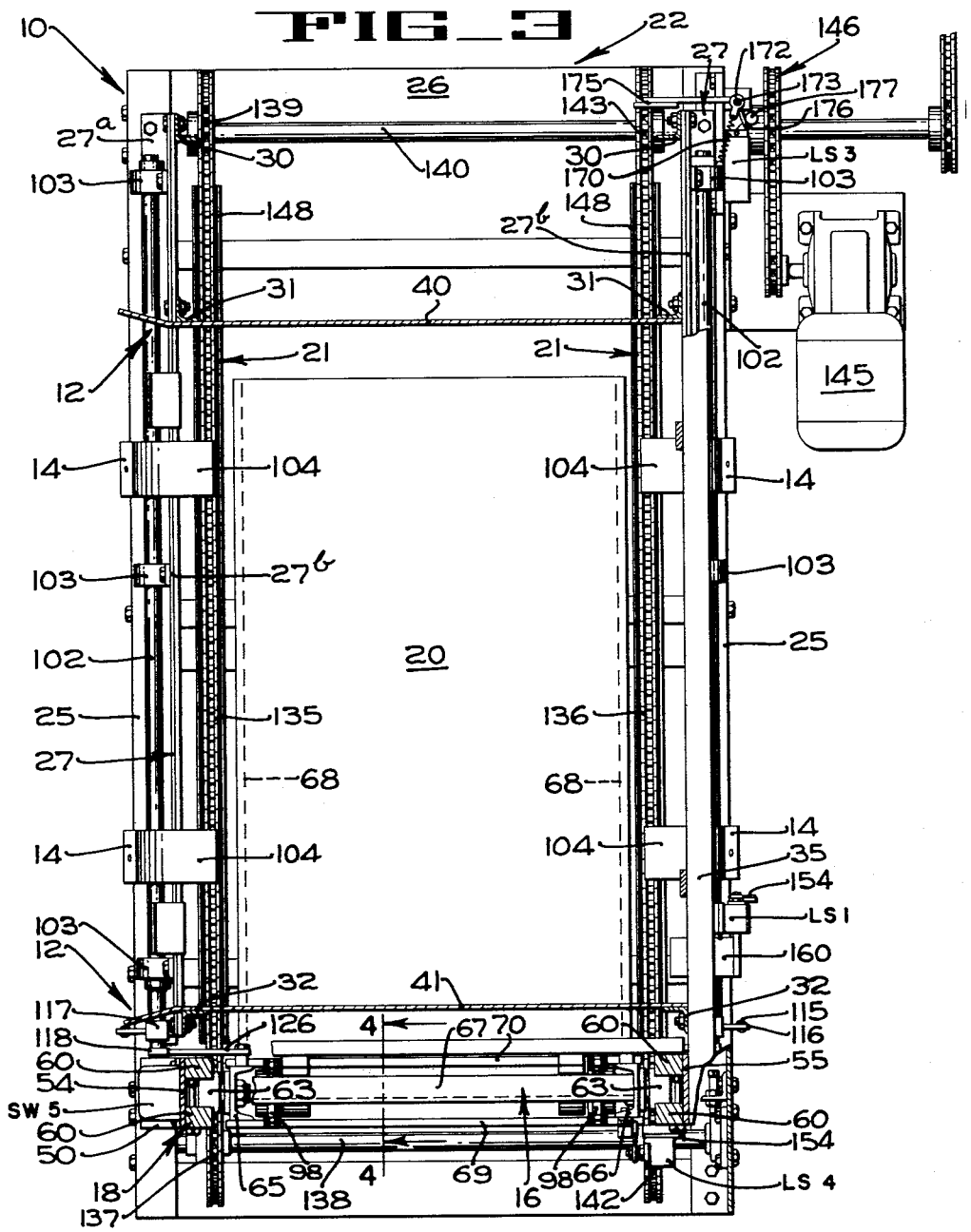
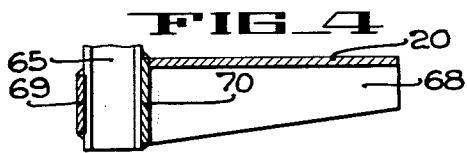
INVENTOR
EARLE J. McGRATH
BY Hans G. Hoffmeister
ATTORNEY

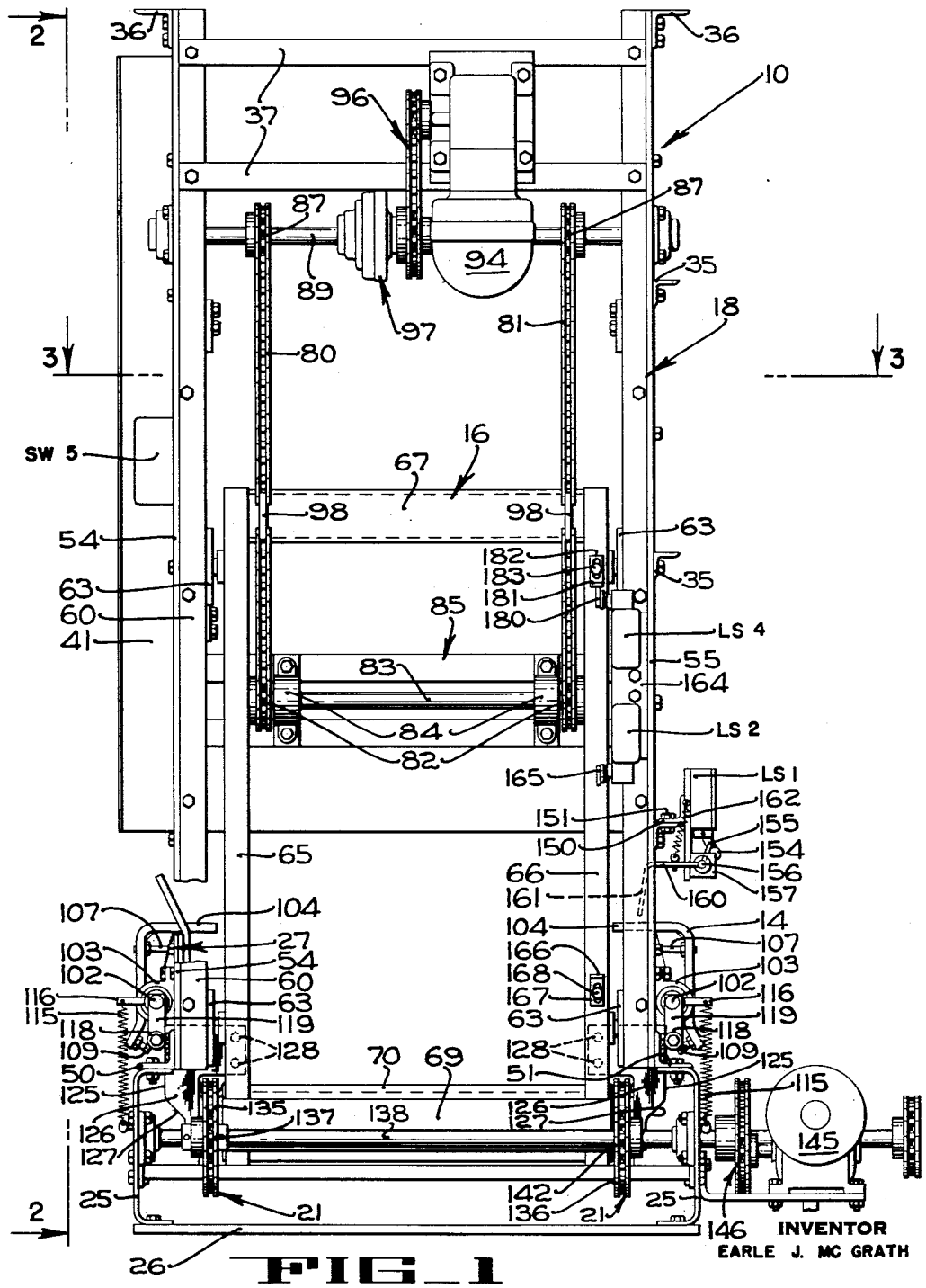

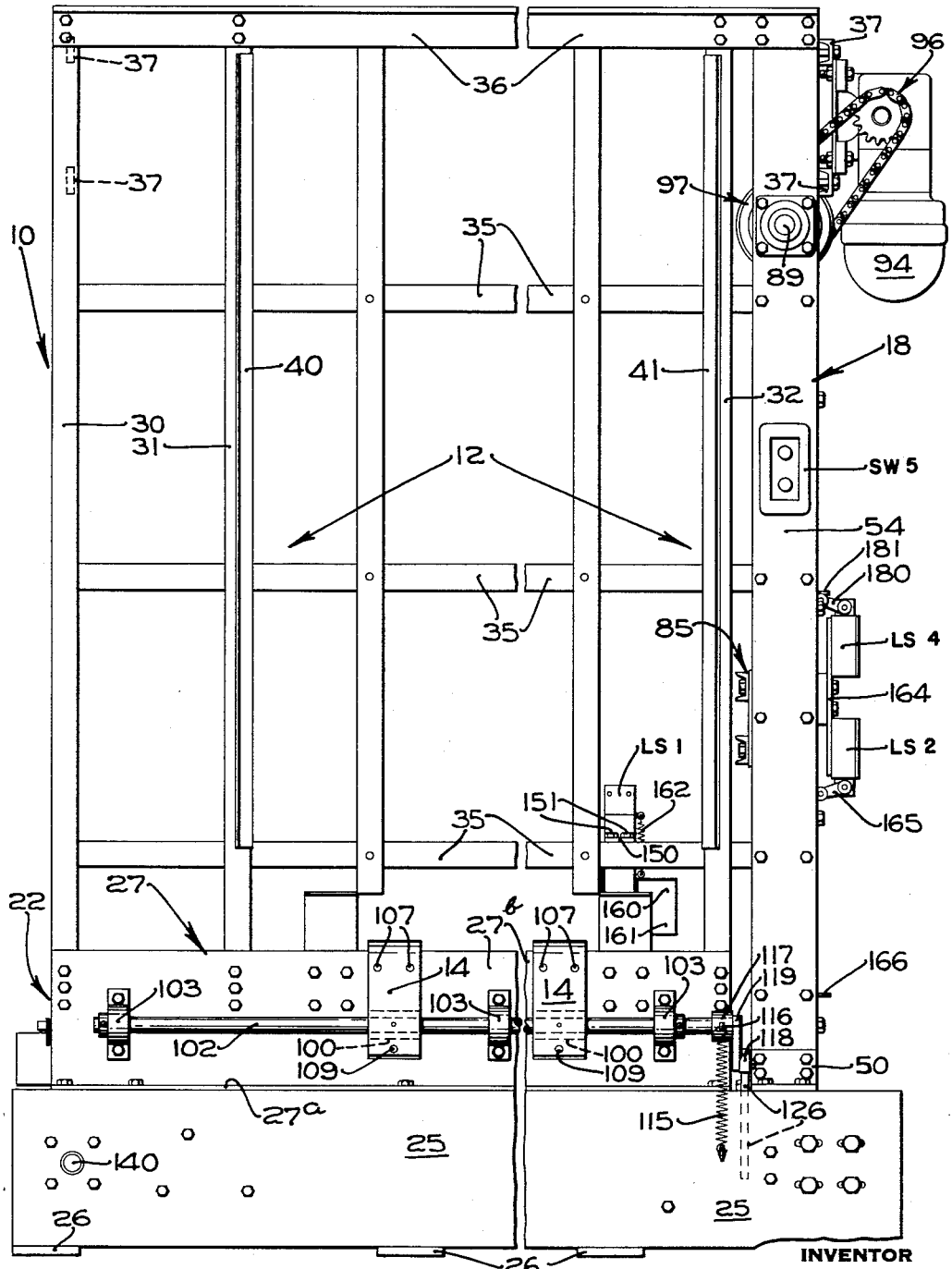
FIG_2

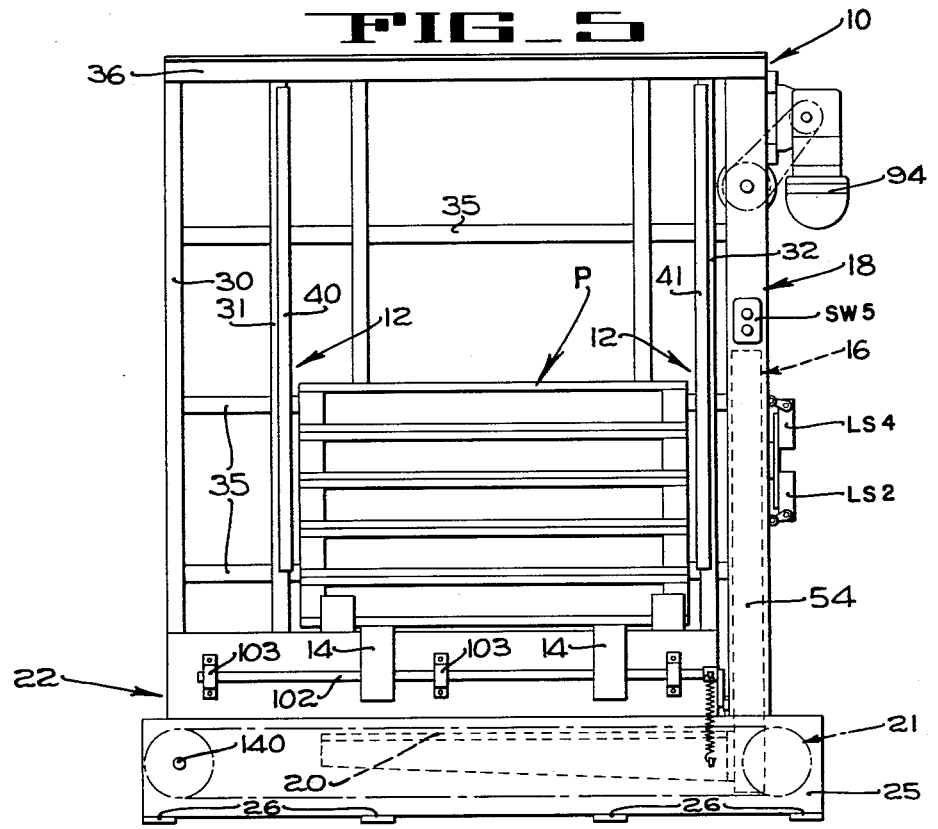
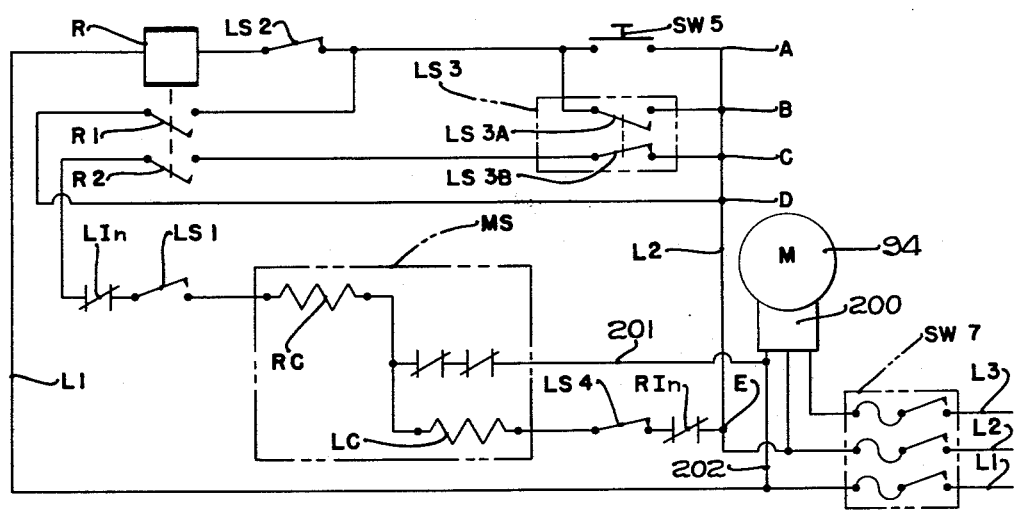

United States Patent Office 3,003,661
Patented Oct. 10, 1961

3,003,661
ARTICLE HANDLING MACHINE
Earle J. McGrath, San Bernardino, Calif., assignor to FMC Corporation, a corporation of Delaware
Filed Apr. 25, 1957, Ser. No. 655,047
5 Claims. (Cl. 221—290)

This invention pertains to apparatus for handling articles and more particularly relates to an improved machine for separating an article, such as a pallet, from a stack of articles.

In many factory operations, containers or the like are stacked on pallets. At present the rather laborious job of handling empty pallets is carried out manually. It is an object of the present invention to provide a machine for automatically feeding empty pallets in a steady flow one at a time to the pallet loading area, whereby man hours expended in handling empty pallets is decreased and damage to the pallets is reduced.

Another object is to provide an improved control mechanism for an article handling machine.

Another object is to provide an efficient article lifting mechanism for such a machine.

Other and further objects of the present invention will become apparent from the following description taken in connection with the accompanying drawings, in which:

FIGURE 1 is a side elevation, with parts broken away, of the machine of the present invention.

FIGURE 2 is a fragmentary front elevation of the machine taken looking in the direction of arrows 2—2 of FIG. 1.

FIGURE 3 is a horizontal section, with parts broken away, taken on line 3—3 of FIG. 1.

FIGURE 4 is a fragmentary section taken on line 4—4 of FIG. 3.

FIGURE 5 is a diagrammatic front elevation of the machine of FIG. 1.

FIGURE 6 is a schematic view of the control circuit used in the machine of the present invention.

The pallet dispenser of the present invention comprises a stationary box frame 10 (FIG. 5) having an opening 12 in the front wall through which a stack of pallets P may be brought into the open central chamber of the machine by means of a fork-lift truck or the like. The stack of pallets is deposited inside the machine on pivotally mounted dogs 14, two of which are mounted on each side of the machine and project a short distance into the interior of the machine. When a pallet is to be dispensed, a carriage 16, which is movable in a vertical direction in an auxiliary guide frame 18, raises a flat lifter plate 20. As the plate 20 moves upwardly, it lifts the stack a short distance upwardly off the dogs 14, cams the dogs outwardly, and then lowers the stack. The camming mechanism is so arranged that the dogs are permitted to move inwardly under the stack after the lowermost pallet is below the dogs. Thus the downward movement of the stack is arrested while the lowermost pallet is deposited on a chain conveyor 21 which moves the pallet toward the left (FIG. 5) through the open discharge side wall 22 of the frame.

The frame 10 comprises a pair of spaced horizontal base channels 25 (FIGS. 1 and 2) which are secured together by a plurality of transverse bars 26. A vertical support plate 27 (FIGS. 2 and 3) has a horizontal leg 27a which is secured in fixed position on the top surface of each channel and a vertical plate portion 27b which projects upwardly from the leg. Three spaced, vertical angle bars 30, 31 and 32 are secured to the support plate 27 at each side of the frame to provide the upright posts of the frame. At the pallet entrance, or forward side, of the frame the two angle bars 31 and 32 (FIG. 2) define the pallet entrance opening 12, while the rear wall is formed by horizontal bars 35 that are secured to the vertical posts of that wall. The upper ends of the posts are secured together by angle bars 36 and tie bars 37 (FIG. 1). A vertical guide panel 40 (FIG. 3) is mounted between the posts 31 interiorly of the frame directly opposite a similar guide panel 41 which is mounted on the posts 32. The ends of the guide panels project through the pallet entrance opening 12 and are bent outwardly to help guide a stack of pallets into the machine.

The auxiliary guide frame 18 is mounted on the right hand end (FIG. 2) of the main frame 10 and comprises a pair of spaced angle brackets 50 and 51 (FIG. 1), each of which has one leg bolted to the top surface of one of the base chanenls 25. Vertical plates 54 and 55 (FIG. 3) are secured at their lower ends to the upright legs of the brackets 50 and 51, respectively, and are bolted at their upper ends to end portions of the angle bars 36 of the main frame. Each of the vertical plates 54 and 55 has two spaced gib bars 60 (FIG. 3) secured to its inner face. Each pair of gib bars defines a vertical guide slot which is arranged to slidably receive a bearing block 63 that is bolted to the carriage 16.

The carriage 16 (FIGS. 1 and 3) includes a pair of vertically disposed channels 65 and 66 which are connected at their upper ends by a channel member 67. At their lower ends the channels 65 and 66 are connected by bars 69 and 70 (FIG. 4). The lifter plate 20, which has a downwardly projecting vertical web 68 at each side, is welded to the side of the bar 70 and is so designed that the lifter plate is supported in a cantilever manner from the channels. It will be noted in FIG. 1 that there are two bearing blocks 63 at each side of the carriage, one disposed near the top of the carriage and the other near the bottom, to guide the carriage 16 in its vertical movement in the guide frame 18.

The carriage 16 is reciprocated in a vertical direction in the frame 18 by means of two chains 80 and 81 (FIG. 1), each of which is trained around a sprocket 82. The sprockets 82 are keyed to an idler shaft 83 that is mounted for rotation in bearing blocks 84 of a stationary support frame 85 fixed to the auxiliary guide frame 18. At the upper end of the frame, each of the chains 80 and 81 is trained around a sprocket 87 which is keyed to a drive shaft 89. A reversible motor 94, which is mounted on frame members 37, drives the shaft 89 through a chain and sprocket drive 96 and a clutch 97. The clutch is a slip clutch, which will automatically break its driving connection to the shaft 89 if any part of the elevating mechanism becomes jammed. Each of the chains 80 and 81 is connected to a bar 98 which is welded to the web of the carriage channel 67. It will be evident that, when the shaft of the motor 94 is rotated in one direction, the carriage will be raised, while rotation of the motor shaft in the opposite direction will cause the carriage to be lowered.

The two stack-supporting dogs 14 (FIGS. 1 and 3) on the rear wall of the machine are identical to the two dogs on the front wall but are facing in the opposite direction. Each of the four dogs has a hub 100 (FIG. 2) keyed on a shaft 102 that is rotatable in bearing blocks 103 mounted on one of the vertical plates 27. Each of the dogs on the front or pallet entrance wall of the machine has an end portion 104 (FIG. 1) that extends into the interior of the frame 10 when the dog is pivoted in a clockwise direction to bring a stop member 107, which is secured to the dog, into contact with the associated vertical plate 27. When the dog is pivoted in a counterclockwise direction, an adjustable stop member 109, which is secured on the lower end of the dog, contacts the vertical plate 27 to define the outermost position of the dog. Each of the two dogs 14 on the rear wall of the machine also has an adjustable stop member 107 that limits the inward, counterclockwise movement of the upper end of the dog and an adjustable stop 109 that limits the outward, clockwise movement of the dog.

The dogs on the front wall are urged in a counterclockwise direction from inner to outer position by a spring 115 (FIG. 1) that is tensioned between the adjacent base channel 25 and an arm 116 that projects radially from a hub 117 (FIG. 2) which is keyed to the shaft 102. Counterclockwise movement of the shaft 102 is limited by means of a roller 118, which is disposed on the end of an arm 119 keyed to the shaft. The roller 118 bears against the camming edge 125 of a cam plate 126 which is secured by bolts 128 to one of the channels 65 and 66 of the carriage 16. The cam plate 126 has an edge portion 127 which permits the roller 118 to move inwardly to allow the spring 115 to swing the dogs 14 on the front wall in a counterclockwise direction to move the end portions 104 out of the machine. Similarly, a cam 126 on the other end of the carriage 16 has a camming edge 127 which permits the spring 115 to swing the dogs 14 in a clockwise direction to move the upper ends 104 of the dogs outwardly of the frame. Accordingly, when the carriage 16 carries the lift plate 20 upwardly in the frame, the dogs 14 will be pivoted to their outermost position when the lift plate reaches a predetermined elevation. When the plate 20 is lowered, the dogs 14 will be swung inwardly as soon as the downwardly moving camming edges 127 engage the rollers 118. As will be explained more fully hereinafter, the dogs 14 are swung outwardly by the springs after the upwardly moving lifter plate lifts the stack up off the dogs, and the dogs are swung inwardly, during the lowering of the stack, after the lowermost pallet and part of the pallet next above are below the dogs. With this arrangement, the dogs arrest the downward movement of the stack but permit the lowermost pallet to be deposited on the discharge conveyor 21.

The discharge conveyor 21 (FIG. 3) comprises a pair of spaced endless chains 135 and 136 which extend longitudinally in the base of the machine between the base channels 25. The chain 135 is trained around a sprocket 137 on an idler shaft 138 and around a sprocket 139 which is keyed to a drive shaft 140. Similarly, the chain 136 is trained around a sprocket 142 on the idler shaft 138 and around a sprocket 143 keyed to the drive shaft 140. The shaft 140 is driven from a motor 145 through a chain and sprocket drive 146. The upper runs of the chains 135 and 136 are supported in guide channels 148.

The raising and lowering of the lifter plate 20 is controlled automatically by means of an electric control system which includes a plurality of switches arranged to be actuated by the carriage and by the pallets on the carriage.

A normally open, switch LS1 (FIG. 1) is mounted on a horizontal angle bar 150 (FIGS. 1 and 2) by means of bolts 151. The switch has an actuator arm 154 which is arranged to be contacted by an arm 155 secured to a shaft 156 which is mounted for rotation in a support block 157. A paddle 160 is secured to the shaft 156 and projects inwardly of the frame and has a downturned end portion 161 which is disposed in a position to be engaged by the lowermost pallet of the stack that is supported by the dogs 14. When the pallet contacts the paddle 160, the shaft 156 is rotated counterclockwise (FIG. 1) to cause the actuator 154 to be moved toward the left to close the contacts of the switch. If there is no pallet on the dogs 14, a spring 162 will swing the paddle 160 clockwise, permitting the contacts of the switch to return to their normally open condition.

A normally closed switch LS2 (FIGS. 1 and 2) is mounted on a plate 164 secured to the auxiliary frame 18 and has an actuator arm 165 arranged to be contacted by a projecting leg 166 (FIG. 1) of an angle member 167 that is adjustably secured to the channel 66 of the carriage 16 by a bolt 168. When the carriage reaches a predetermined elevated position, the switch arm 165 is contacted and the contacts of switch LS2 are opened.

A switch LS3 (FIG. 3) is mounted on the frame 10 at the discharge end 22 of the machine. The switch is normally held in the position of FIG. 3 by a spring 170 which is connected between the frame and an arm 172 keyed to a shaft 173 which projects through the switch housing. A paddle 175, which is secured to the shaft 173, projects inwardly of the frame of the machine to a position wherein it is contacted and swung in a clockwise direction by each pallet leaving the machine. An arm 176 is connected to one end of the shaft 173 so that, when the paddle is swung clockwise, the arm 176 will release an actuator arm 177 of the switch, causing one set of contacts of the switch to be moved to open position and another set to be moved to closed position.

A normally closed switch LS4 (FIGS. 1 and 2) is mounted directly above switch LS2 on the mounting plate 164. This switch has an actuator arm 180 arranged to be contacted by a projecting leg 181 of an angle member 182 that is adjustably secured to the channel 66 of the carriage 16 by a bolt 183. When the carriage reaches its lowermost position, the arm 180 is engaged and the contacts of the switch are opened. A manually operated start switch SW5 (FIG. 1) is mounted on the front wall of the frame 10.

The control circuit of the machine is shown in FIGURE 6. It is to be noted that the pallet discharge conveyor 21 is automatically and separately controlled by the demands for empty pallets of the machine to which the pallet is being delivered and, accordingly, the controls for conveyor motor 145 is not included in this control diagram.

Three phase power from a suitable source is fed into the circuit from trunk lines L1, L2 and L3 through a main disconnect switch Sw7, the contacts of which are closed when the dispenser is in operation. Lines L2 and L3 are connected directly to the starter 200 of the reversible motor 94 of the lifter carriage 16. The push button switch Sw5 is connected in a circuit A in series with switch LS2 and with the coil of a relay R. A holding circuit D for relay R is connected between lines L1 and L2 through contacts R1 of relay R, switch LS2 and the coil of relay R. The switch LS3, which is actuated by a pallet leaving the machine, has a set of normally open contacts LS3A connected in circuit B in series with the switch LS2 and the coil of relay R. A reversible magnetic starter MS has two coils RC and LC which control the raising and lowering, respectively, of the lifter carriage 16. When the raise coil RC is energized, the output shaft of the carriage motor 94 is rotated in one direction to raise the carriage. When the lowering coil LC is energized, the motor output shaft is rotated in an opposite direction to lower the carriage. Both coils RC and LC are connected to the motor starter 200 by a conductor 201, and are connected to the L1 line after the line leaves switch Sw7 by a conductor 202. The raise coil RC is connected in a circuit C in series with switch LS1, a lower interlock LI$n$, contacts R2 of relay R, and normally closed contacts LS3B of switch LS3. The lowering coil LC is connected in a circuit E in series with switch LS4 and a raise interlock RI$n$.

In the following descriptions of the operation of the pallet dispensing machine, it will be assumed that the lift carriage is in its lowermost position, that there is no pallet on the discharge conveyor 21, and that a stack of pallets have just been moved into the machine and deposited on the four dogs 14. It will be understood that, when the pallets are in the machine, the open sides of the typical wooden pallets face the front and rear walls of the frame, while the closed sides of the pallets face the sides of the frame. In its lowered position, the carriage holds open the contacts of switch LS4 in circuit E. Also at this time the lowermost pallet in the stack is holding closed the contacts of switch LS1 in circuit C. All other switches and contacts will be in the condition shown in FIG. 6.

To put the machine into operation, the attendant momentarily closes push button switch Sw5 to close circuit A and energizes the coil of relay R. Contacts R1 in circuit D are closed, forming a holding circuit for relay R. Contacts R2 in circuit C are closed, energizing circuit C and the raise coil RC and opening the raise interlock RI*n* in circuit E. The lifter carriage 16 starts upwardly, causing the angle member 182 on the carriage to release the switch LS4 and permit it to return to its normally closed position. The lifter plate 20 is moved up under the stack of pallets to lift the stack off the dogs 14. It will be seen in FIG. 1 that, during an early part of the upper movement of the carriage, the roller 118 which controls each dog 14, moves to a point opposite the camming edge 127. However, the spring 115 cannot, at this time, swing the shaft 102 in a direction to cause the roller to follow the camming edge, due to the weight of the pallets resting on the dogs 14. As soon as the lifter plate lifts the stack off the dogs, each spring 115 swings its associated dog outwardly from under the stack. Soon after the dogs are swung outwardly, the angle member 167 on the carriage contacts actuator arm 165 of switch LS2 to open the contacts of the switch and open circuit A. The relay R is deenergized, causing contacts R1 and R2 to open. When contacts R2 in circuit C are opened, the raise coil is deenergized and the upward movement of the stack is arrested. At the same time, the raise interlock RI*n* in circuit E is closed. The closing of raise interlock RI*n* completes circuit E and effects the energization of the lowering coil LC and the opening of lower interlock LI*n*. The shaft of motor 94 is then driven in a reverse direction causing the carriage 16, and the lifter plate 200 thereon, to be lowered.

When the stack is lowered a predetermined distance, the camming edges 127 engage the rollers 118 and cause the dogs to be pivoted inwardly. The camming edges are so mounted on the carriage that the dogs will be moved inwardly after the lowermost pallet and part of the second lowermost pallet have dropped to a position below the dogs. Accordingly, the dogs will move into the open end of the second lowermost pallet, so that the downward movement of the stack is stopped when the top panel of this pallet comes to rest on the dogs. The lifter plate 20 continues downwardly to a position between the chains 135 and 136 and deposits the pallet on the chains. When the lifter plate reaches its lower position, the angle member 182 on the upper part of the carriage engages the actuator arm of switch LS4 to open the contacts of the switch and deenergize circuit E. The lower coil is thus deenergized and the lower interlock LI*n* in circuit D is closed. Upon demand from the machine to which the pallets are being delivered, the conveyor motor 145 is started and the pallet is carried out the discharge end 22 of the machine. As the pallet passes switch LS3, it engages the actuator arm 175 and momentarily closes the contacts LS3A in circuit B to again energize relay R and repeat the operation of removing a pallet from the stack.

Under normal operating conditions, a supply of pallets is maintained in the machine. However, if the last pallet should be removed from the machine, the contacts of switch LS1 in circuit C will open to prevent the energization of the raise coil, and thus the machine will stop operating until a new stack of pallets is placed on the dogs.

From the foregoing description it will be seen that the present invention provides a compact pallet dispensing machine which makes use of a simple, uncomplicated control circuit. The provision of cams on the lifter carriage for actuating key switches in the system makes possible an arrangement wherein the movements of the lifter plate are accurately coordinated with the movement of the stack-arresting dogs. Further, the use of a cantilever type of lifter plate eliminates the need for cumbersome plate-lifting apparatus in the working zone of the machine.

It will be understood that modifications and variations may be effected without departing from the scope of the novel concepts of the present invention.

The invention having thus been described, that which is believed to be new and for which protection by Letters Patent is desired is:

1. In an article dispensing machine a support structure having an open central chamber, a plurality of dogs pivotally mounted on said structure and having end portions movable from a projected stack-supporting position within said chamber to a retracted position, a carriage mounted for vertical movement in said structure, a lifter plate extending across said chamber and carried by said carriage for movement upwardly in said chamber between said projected dogs to a predetermined elevation above said dogs to lift upwardly a stack of pallets disposed on said dogs, a reversible electric motor mounted on said support structure and having an output shaft, said motor including a raise coil arranged to drive the output shaft in a first direction upon being energized and a lowering coil arranged upon being energized to drive the output shaft in a second direction, elevating means operatively connecting said output shaft to said carriage in such a manner that rotation of said shaft in said first direction causes raising of said carriage and rotation of said shaft in said second direction causes lowering of said carriage, said elevating means including a sprocket secured to said output shaft and a chain trained around said sprocket and having both end portions secured to said carriage, a discharge conveyor disposed in said support structure and arranged to carry individual pallets out of said chamber, means responsive to movement of a pallet out of said chamber by said discharge conveyor for energizing said raise coil to elevate said carriage, means operable by said carriage for denergizing said raise coil and energizing said lowering coil when said lifter plate reaches said predetermined elevation, and cam means on said carriage movable into contact with said dogs and arranged to urge said dogs inwardly at a predetermined time during the lowering of said lifter plate to move the end portions of the dogs into position under a pallet of said stack.

2. In an article dispensing apparatus, a support structure, a carriage mounted for vertical reciprocating movement on said structure and having an article support surface, a plurality of dogs pivotally mounted on said structure for movement from an article-intercepting position in the path of downward movement of articles disposed on said support surface to a withdrawn position, spring means disposed between said structure and said dogs and arranged to urge said dogs to said withdrawn position, and cam means carried by said carriage and operatively associated with said dogs and having a camming surface adapted to hold said dogs for a predetermined time during the upward movement of said carriage in said article-intercepting position against the urging of said spring means and to then permit movement of said dogs to said withdrawn position, said article support surface of said carriage being so located relative to said camming surface that, during upward movement of said carriage, articles are lifted from said dogs before said camming surface permits said spring to pivot said dogs to withdrawn position.

3. In an article dispensing machine, a support structure having an open central chamber, a plurality of dogs pivotally mounted on said structure and having end portions movable from an inner stack-supporting position within said chamber to an outer retracted position, spring means connected between said support structure and said dogs, said spring means urging such dogs from their inner stack-supporting position to their outer retracted position, a lifter platform mounted for vertical movement in said chamber, means for raising and lowering said platform, cam means movable with said platform and arranged to engage said dogs and hold said dogs in said stack-supporting position within said chamber against the force of said spring means when said platform is in lowered position, said cam means clearing said dogs during upward movement of said platform, before the platform engages and lifts the stack from said dogs, the weight of the stack on said dogs holding the dogs in their inner stack supporting position when said cam means clears the dogs, further upward movement of said platform raising the stack of pallets from said dogs, whereupon said spring means swing said dogs outwardly to their retracted position, said cam means also clearing said dogs so that they remain in their retracted position upon subsequent lowering of said platform to a position wherein the lowest pallet is beneath said dogs, further lowering of said platform causing said cam means to re-position said dogs into their inner stack-supporting position for supporting the pallets directly above the lowest pallet.

4. In an article dispensing machine, a support structure, dogs mounted in said support structure for releasably supporting a stack of articles, a pair of spaced endless chains having upper horizontal runs disposed in parallel relation at the lower end of said structure and arranged to convey articles that are wider than the spacing of said chains away from said structure, means to drive said chains, an article supporting platform mounted for vertical reciprocating movement in said support structure, means for raising and lowering said platform, said platform being disposed above the parallel upper runs of said chains when in its elevation position, said platform being disposed between and below the parallel upper runs of said chains when in its lowered position, means for releasing said dogs from their stack-supporting position when said platform moves a predetermined distance upward from its lowered position, means for restoring said dogs to stack-supporting position when said platform has been re-lowered to a position wherein the lowest article in the stack is below said dogs, continued lowering of said platform to its lowered position between said chains depositing the lowest article onto the upper runs of said chains.

5. In a pallet dispensing machine, a box-like housing having front and rear wall portions and spaced side walls, means defining an entrance opening in the front wall portion for receiving a stack of pallets and means defining a pallet discharge opening in one side wall, a pair of spaced vertical tracks at the other side wall, a carriage mounted for vertical reciprocation along said tracks, means for raising and lowering said carriage, a platform extending laterally from the lower portion of said carriage and into said housing, said platform extending across the entrance opening in said front wall portion, spaced conveyor means extending laterally along said front and rear wall portions and at each side of said discharge opening, drive means for said conveyor means, said platform being movable to a position between and below said spaced conveyor means for depositing a pallet on said conveyor means for delivery through the pallet discharge opening in said one side wall and hence out of said housing.

References Cited in the file of this patent

UNITED STATES PATENTS

| | | |
|---|---|---|
| 548,056 | Hewitt | Oct. 15, 1895 |
| 1,022,680 | Johnson | Apr. 9, 1912 |
| 1,034,070 | Brown | July 30, 1912 |
| 1,330,639 | Leumann | Feb. 19, 1920 |
| 1,393,588 | Tuttle | Oct. 11, 1921 |
| 1,600,958 | Hart et al. | Sept. 21, 1926 |
| 2,045,292 | Carey | June 23, 1936 |
| 2,338,714 | Garner | Jan. 11, 1944 |
| 2,397,720 | Beane | Apr. 2, 1946 |
| 2,403,942 | Mathers | July 16, 1946 |
| 2,604,996 | Smith | July 29, 1952 |
| 2,629,503 | Neja | Feb. 24, 1953 |
| 2,653,679 | Hamilton | Sept. 29, 1953 |
| 2,696,326 | Clem | Dec. 7, 1954 |
| 2,701,650 | Stevenson | Feb. 8, 1955 |
| 2,702,132 | Van Doren | Feb. 15, 1955 |
| 2,769,570 | Adams | Nov. 6, 1956 |
| 2,858,043 | Fenton et al | Oct. 28, 1958 |
| 2,893,596 | Gabrielsen | July 7, 1959 |